Nov. 23, 1965    R. DRESSLER ETAL    3,218,871
ANGULAR ROTATION DETECTION SYSTEM UTILIZING
THE DISPLACEMENT OF ELECTRON BEAM
Filed Nov. 17, 1961    3 Sheets-Sheet 1

INVENTOR.
R. DRESSLER
M. HALBERSTAM
BY
*William V. Pesce*
ATTORNEY

Nov. 23, 1965    R. DRESSLER ETAL    3,218,871
ANGULAR ROTATION DETECTION SYSTEM UTILIZING
THE DISPLACEMENT OF ELECTRON BEAM
Filed Nov. 17, 1961    3 Sheets-Sheet 2

INVENTOR.
R. DRESSLER
M. HALBERSTAM
BY
ATTORNEY

Nov. 23, 1965  R. DRESSLER ETAL  3,218,871
ANGULAR ROTATION DETECTION SYSTEM UTILIZING
THE DISPLACEMENT OF ELECTRON BEAM
Filed Nov. 17, 1961  3 Sheets-Sheet 3
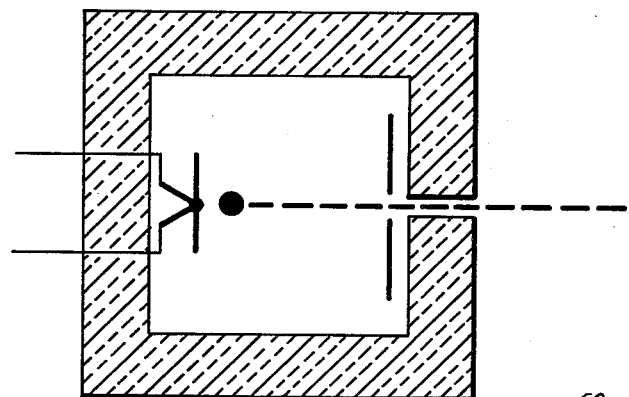
Fig. 5
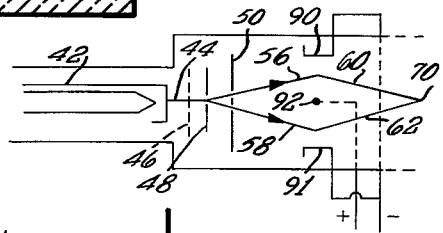
Fig. 6
Fig 4a
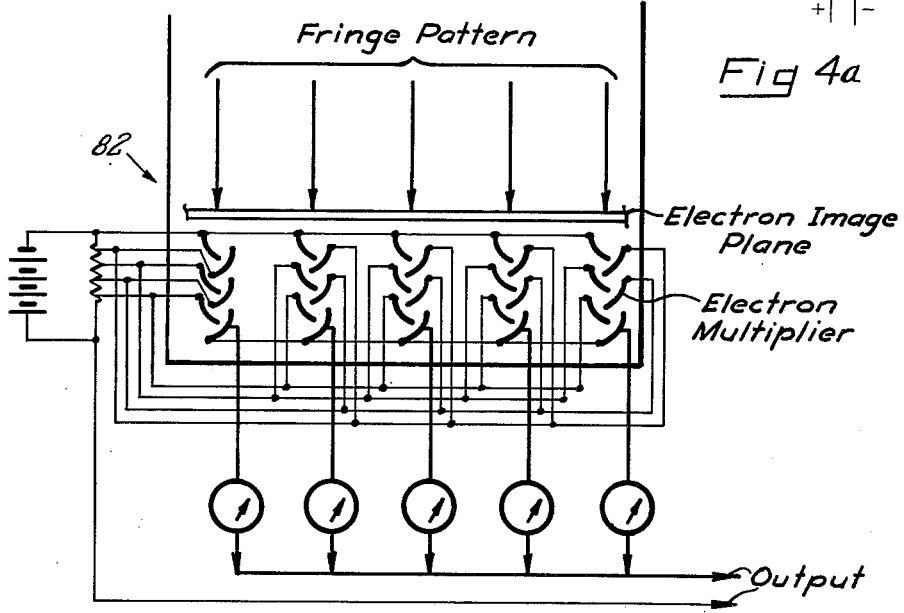
INVENTOR.
R. DRESSLER
M. HALBERSTAM
BY
ATTORNEY

United States Patent Office 3,218,871
Patented Nov. 23, 1965

3,218,871
ANGULAR ROTATION DETECTION SYSTEM UTILIZING THE DISPLACEMENT OF ELECTRON BEAM
Robert Dressler, Elmont, and Mendel Halberstam, Brooklyn, N.Y., assignors, by mesne assignments, to the United States of America as represented by the Secretary of the Air Force
Filed Nov. 17, 1961, Ser. No. 153,785
1 Claim. (Cl. 73—505)

This invention relates to an angular rotation detection system, and is more particularly directed to a system which includes a method and apparatus for detecting and measuring the absolute rotation of a vehicle in any environment such as space, atmosphere, water and the like.

In any type of guidance system used today, the measurement of small angular deviation of such vehicles relative to some absolute fixed frame of reference must be accurately measured to avoid any errors in vehicle position. An angular deviation of a vehicle about a given axis can result only from a change in the angular velocity of the vehicle about that axis. It is the principal object of this invention to provide a device of great sensitivity and accuracy for detecting and measuring a change in the angular velocity of a vehicle about a given axis relative to a predetermined reference angular velocity about that axis. Integration of this change over a given interval gives the net angular deviation of the vehicle about this axis at the end of the interval.

Briefly stated, the device is a rotational interferometer in which electrons or ions are utilized instead of light. Since the wavelengths associated with these particles are much shorter than the wavelengths of light, a great increase in sensitivity results. In addition, a further increase in sensitivity is obtained in accordance with the invention by a novel method of converting the shift in the interference pattern into an output signal. This method, particularly applicable where the particles are electrons, involves the magnification of the electron image of the interference pattern sufficiently for a plurality of the bands in the pattern to be sensed by individual electron multipliers, the sum of the individual electron multiplier outputs constituting the output signal.

The invention will be explained in more detail with reference to the accompanying drawings in which:

FIG. 4a shows suitable electrostatic electron optics for use in FIG. 4.

FIGURE 5 shows a typical ion oven for developing an ion beam.

FIGURE 6 shows a typical electron multiplier for amplifying an electron beam signal.

Figure 1:
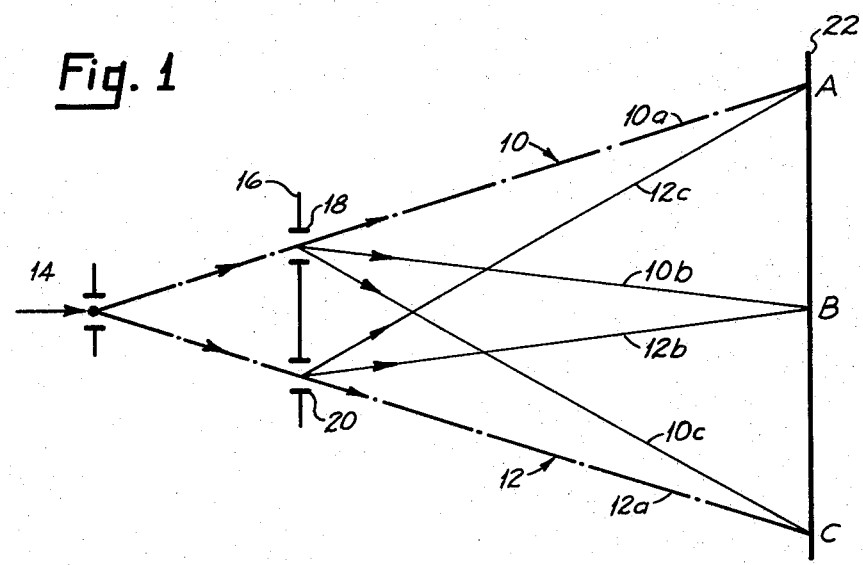
FIGURE 1 is a diagram, for instructive purposes, of a system, showing how reinforcement and annulment of interferring coherent light beams produce fringes or a fringe pattern of light and dark areas.

Now referring to the drawings and particularly to FIGURE 1, there is shown for instructive purposes, an arrangement for producing a pair of coherent light beams 10 and 12 from a single light source 14. In particular, an apertured member 16 is provided with a pair of apertures 18 and 20 for effecting a pair of coherent beams 10 and 12. It may be said here that the wave character of light leads to some important consideration involving interference effects. The superposition of two coherent light waves, i.e. two waves emanating from a common source, upon arriving simultaneously at a given point will produce a total illumination that depends upon their wavelengths, amplitudes, and phases. Waves of equal amplitude will reinforce each other if they arrive in phase and will annul each other if they arrive in opposite phase. When they annul and produce zero illumination at certain points, there will be other points where the illumination is increased, since the total energy of the waves remains unchanged. From a study of FIGURE 1, it can be seen that coherent beam 10 may be considered having light rays 10a, and 10b, and 10c, each terminating on a given surface or plane 22. In a similar manner coherent beam 12 may be considered as having light rays 12a, 12b and 12c each terminating in the same plane 22 at the same points A, B, and C as before. A study of points A, B, and C would show that their brightness varies in accordance with the reinforcement or annulment effect of the interfering coherent light rays. This interference effect gives rise to a fringe pattern along the plane 22. The spacing of the fringes is a function of the wave length and aperture spacing as well as the distance from the beam splitting aperture and the point of impingement of the light rays or plane of interference and fringe pattern.

Figure 2:
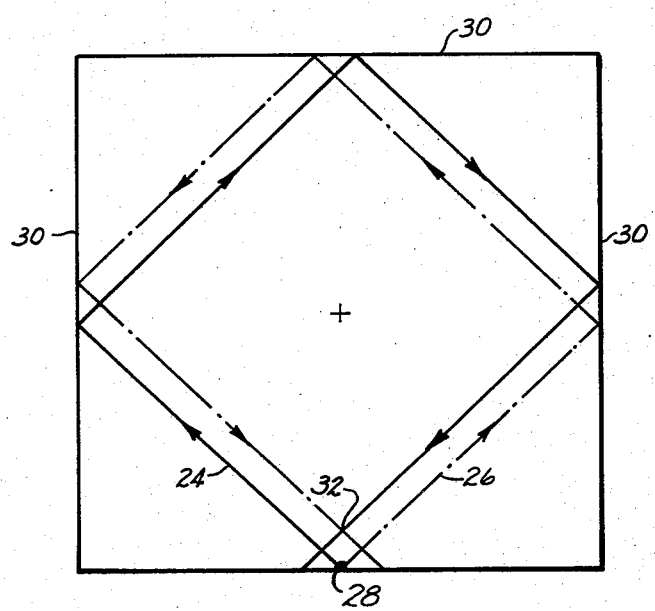
FIGURE 2 is a diagram, for instructive purposes, using the principles involved from FIGURE 1 but wherein a fringe pattern is produced by two coherent beams traversing different fixed paths.
Figure 3:
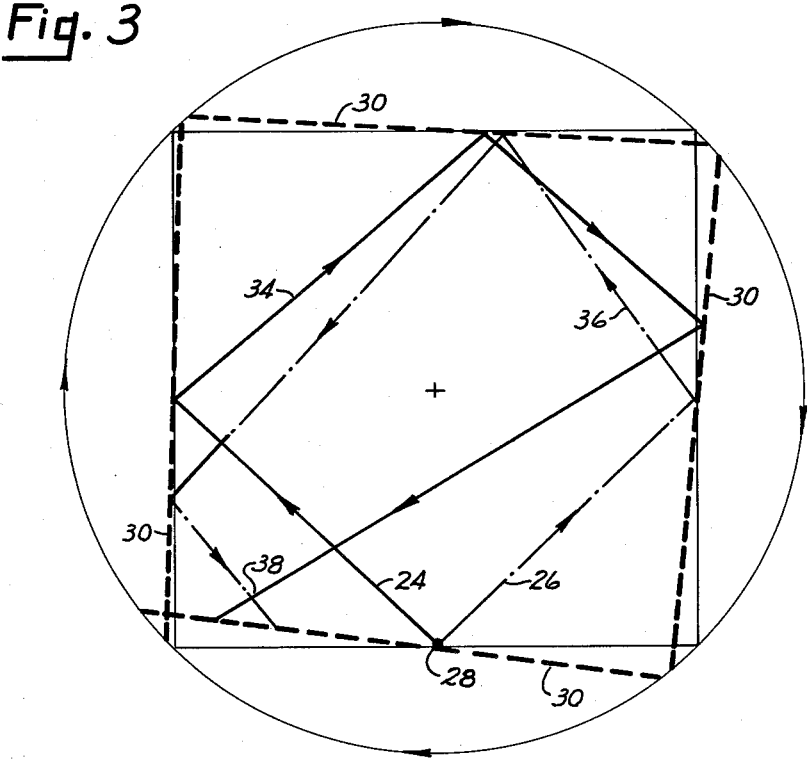
FIGURE 3 is a diagram, similar to FIGURE 2 but where the beam path has been altered to produce a change in the fringe pattern by the interfering coherent light beams.

In carrying the effects of fringe patterns further there is shown in FIGURE 2, for illustrative purposes, a pair of coherent light beams 24 and 26 originating from a common source 28 and made to traverse opposing light paths as defined by intersecting walls 30 to form an interference position 32 at which an interference or fringe pattern is produced. Although the position 32 appears as a point, it may be appreciated that a fringe pattern actually appears here since the light beam contains many rays of light, some of which oppose and others which reinforce to form the familiar fringe effect, the effect we are discussing here. To proceed further it may be appreciated that if the respective paths which the two coherent beams traverse, vary, e.g. one path may grow shorter whereas the other simultaneously grows longer, the point of interference or intersection of the beam accordingly changes. This means that the fringe pattern will correspondingly change also. Such variations in path lengths occur when the reflecting walls 30 are rotated about an axis normal on the plane of beams 24 and 26. Since the light after leaving source 28 or after being reflected from a wall 30 continues in its direction in space independently of the motion of source 28 or the reflecting walls, any such rotation results in a difference in the lengths of the two paths traveled by the light between source 28 and the point 32. FIGURE 3 shows in an approximate manner the positions of the reflecting walls 30 when struck by the light in beam 24 for a clockwise rotation of the structure. As shown by the dotted lines, the wall first struck by beam 24, at the left of the figure, has undergone the least rotation whereas the wall last struck by this beam, at the bottom of the figure, has undergone the maximum angular displacement. A similar situation, not illustrated for simplicity, exists for beam 26 except that in this case the wall at the right of the figure is struck first and hence will have undergone the least displacement. It will be apparent from FIGURE 3 that the reflective beams 34 and 36 are now traversing reflective paths different from the paths originally shown in FIGURE 2, so that the interference point 38 is displaced from the position 32 shown in FIGURE 2. In other words, the interference pattern or fringes have changed their respective positions in accordance with the change in the respective light reflective paths. However, these paths have changed directly with the degree of angular movement so that in effect you have a situation where the fringe change is a direct result of the degree of rotation or a direct function thereof. These ideas and principles were first reported by G. Sagnac in "Comptes Rendu" 157,708 (1913) and "Journal de Physique" 4 Ser. 5,177 (1914). Further, it was shown and verified experimentally by Michaelson and Gale in "Astrophysics Journal 61,140 (1925) that where apparatus is rotated a shift in the fringe pattern will be obtained which shifts is a function of the rotation and may be expressed as follows:

$$z = \frac{4\omega s}{c\lambda}$$

where:
$z$=fractional displacement of the fringes
$s$=area enclosed by the beam path
$\gamma$=wavelength of electromagnetic radiation used
$\omega$=angular velocity of the device
$c$=velocity of light.

It may be appreciated that the above has been provided with a view towards teaching what is produced by changing the light path of interfering light beams and how rotation of the light paths changes the fractional displacement of the fringes so that in effect any measurement of the fractional displacement will be a direct measurement of the degree of rotation of the apparatus. However, the wavelength of light being such as it is small changes in rotation will not create any appreciable differences in fringe displacement unless the area enclosed by the beam path is made unrealistically large. To overcome this impediment and to provide a workable angular rotation detection system, the invention as embodied herein contemplates the use of wavelengths much shorter than available with light. In accordance with de Broglie's postulate, any moving particle has a wave associated with it the wavelength $\gamma$ of which is given by the expression $$\lambda = \frac{h}{mv}$$

where $m$ is the mass of the particle, $v$ its velocity and $h$ is Planck's constant. For an electron $$mv = \sqrt{2mVe},$$

where $e$ is the electron charge and $V$ is the accelerating voltage, so that $$\lambda = \frac{h}{\sqrt{2mVe}}$$

Coherent sources with wavelengths in the range of $\frac{1}{10}$ to $\frac{1}{1000}$ of an angstrom unit (1 angstrom unit=$10^{-8}$ cms.) may be made with electrons or ions. Such an electron source is described by G. Mollenstedt and H. Duker in Naturwissenschaften 42, 41 (1955). As seen in this article, 30 kv. electrons have wavelengths of 0.07 angstrom units. Even shorter wavelengths may be obtained with ions because of their greater mass which results in a greater momentum mv and therefore a shorter $\lambda$ for the same velocity. By using such relatively small wavelengths, the special angular variation of an apparatus or vehicle in motion can be conveniently and accurately measured with a degree of precision heretofore not available or possible.

Figure 4:
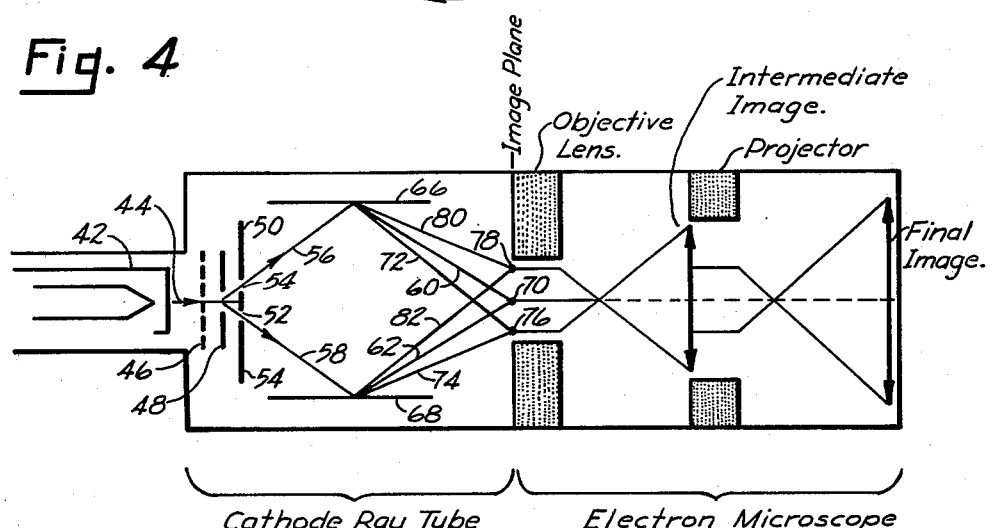
FIGURE 4 shows a device for producing a pair of interfering particle coherent beams to produce a beam fringe pattern and means for selectively magnifying this fringe pattern.

There is shown in FIGURE 4 a tube device 40 having certain common hardware components. As for example, the tube comprises either an indirectly heated cathode 42 which produces electrons or an ion oven as shown in FIGURE 5 which produced ions. In either case, the charged particles forming beam 44 are accelerated and controlled by electrodes 46 and 48 which in effect control the velocity and beam density as well as any modulated effects. The control electrodes effect the wavelength of the beam particles, since they control the particle velocity to which the wavelength is inversely related as shown above, and such wavelengths can be accordingly altered depending upon the degree of angular rotation to be anticipated, and the accuracy desired. The beam 44 impinges an apertured electrode 50 having a pair of apertures 52 and 54 through which a pair of divergent coherent beams 56 and 58 are formed from the original incident beam 44. The beams 56 and 58 are then made to change directions, using suitable electron optical techniques (not shown), either magnetic or electrostatic, producing in effect two imaginary reflecting planes 66 and 68, so as to converge along paths 60 and 62 and interfere at a point 70 which may be considered the plane of interference at which a fringe pattern is formed. Again it must be repeated that although a point configuration is shown at the plane of interference, it is to be appreciated that actually a fringe pattern of opposing and reinforcing beams are formed which result in a spaced beam density variation at the plane of interference. It is this variable beam density characteristic which is equivalent to the fringe pattern previously discussed. Now suppose the device 40 is given an angular movement about an axis perpendicular to the plane of the two split beams, in the clockwise direction, there will be effectively a change in the beam path for reasons already explained in connection with FIGURES 2 and 3, the beams 56 and 58 now traversing paths 72 and 74 respectively to produce an interference fringe pattern at point 76. It can be seen here that the point 76 is displaced a finite distance from point 70 so that the fringe pattern in this position will define a different displacement than the fringe pattern depicted at point 70. This displacement variation is an actual measure of the degree of rotation effected. Proceeding in a similar manner, if the device is given a similar angular movement in a counter-clockwise direction the effect would be to produce a fringe point 78 caused by interfering beams 80 and 82. Again a fringe displacement is effected but in a direction from point 70 which is opposite to point 76. This type of fringe displacement would indicate an angular movement opposite to the one previously detected.

The above referenced article in Naturwissenschaften discloses electron optics that may be used in the apparatus of FIG. 4 to produce the desired convergence of divergent beams 56 and 58. The electrostatic electron optical biprism shown in this article will operate to cause two diverging electron beams to converge in the same manner that an optical biprism is able to produce convergence of two diverging light beams. FIG. 4a illustrates the application of this technique to the apparatus of FIG. 4. Referring to this figure, the two electrodes 90 and 91 are at the same direct potential which is negative relative to the potential of a fine wire electrode 92 normal to the plane of beams 56 and 58. The electrostatic field between wire 92 and electrodes 90 and 91 produces the required changes in beam directions. A more extensive article on the electron optical biprism by the authors of the above referenced article may be found in Zeitschrift fur Physik 145–377 (1956).

The image plane of the fringe points 70, 76 and 78 forms terminal points of the beam producing apparatus. It next becomes necessary to utilize means for detecting and sensing the fringe points and the displacements thereof for visual observations. One such arrangement is the utilization of an electron microscope 82 which will magnify the displacement of the fringe points.

With further reference to FIGURE 4, there is shown in diagrammatic form an electron microscope 82 attached to the cathode ray tube 40. The electron microscope is of the type described in the book entitled "Electron Microscopy" by R. W. G. Wyckoff, Interscience Publishers, N.Y., chapter 2. In particular it comprises a pair of objective and projector magnetic lenses for amplifying or magnifying the fringe displacement pattern sufficiently to determine with preciseness the degree of angular displacement and its direction. The fringe pattern is observed at the final image plane either by the naked eye or it may be recorded on some other media for storage purposes.

By using an electron source such as described by Mollenstedt and Ducker in Naturwissenschaften 42, 41 (1955) the measurement of angular velocities in the range of $\frac{1}{10}$ to 10 times the earth's angular velocity is feasible. However, with ions, the measurement of angular velocities in a much smaller range is foreseen.

It may be appreciated that certain modifications and changes may be made to the invention as embodied herein but which do not detract from the true purpose and intent of the invention. As for example, an ion source rather than an electron source may be provided as shown in FIGURE 5, the particular figure specifically showing an oven having a heating element for the purpose of heating certain materials which give off ions. There is also shown in FIGURE 7 an electron multiplier common to the electron art and particularly adapted to the invention herein.

Having defined the invention what is claimed is:

Apparatus for detecting a change in the angular velocity of an object comprising: an evacuated cylindrical envelope; a source of electrons at one end of said cylindrical envelope; means for accelerating the electrons from said source to a predetermined velocity along the axis of said envelope; means displaced a first distance along said axis from said end of said cylindrical envelope for deriving from said accelerated electrons two diverging electron beams; electron optical means displaced a second distance greater than said first distance along said axis from said end of said cylindrical envelope for acting on said diverging beams to cause them to converge and intersect on a plane normal to said axis, producing as a result an interference pattern in the form of an electron image; and an electron microscope located on said axis so that its input is the interference pattern and its output is a visual indication of the change in angular velocity of said object.

References Cited by the Examiner
UNITED STATES PATENTS 3,102,953   9/1963   Wallace _____ 73—504

BENJAMIN A. BORCHELT, *Primary Examiner.*

CHESTER L. JUSTUS, SAMUEL FEINBERG,
*Examiners.*